UNITED STATES PATENT OFFICE.

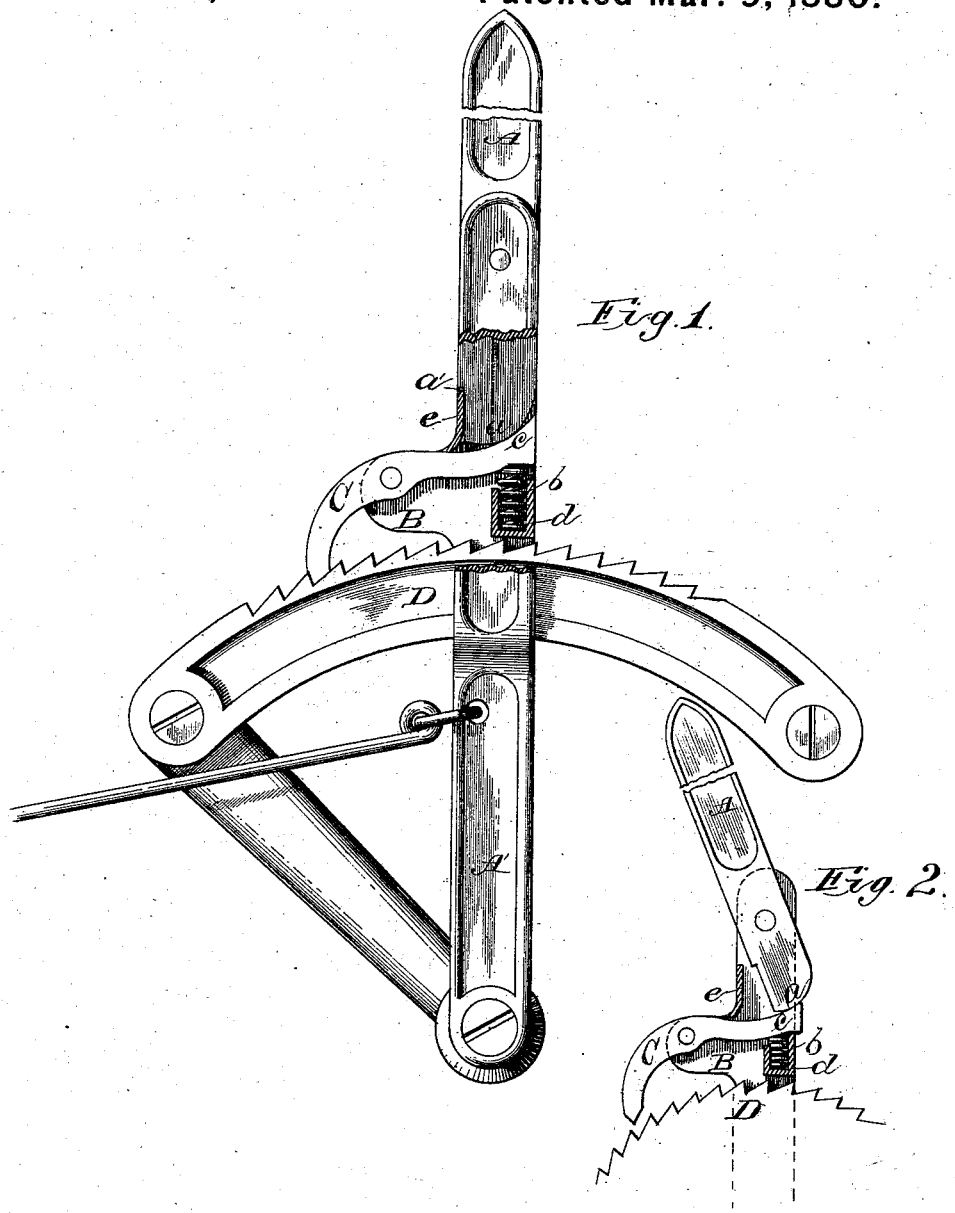

ABNER C. FISH, OF RACINE, WISCONSIN.

BRAKE-LEVER.

SPECIFICATION forming part of Letters Patent No. 225,358, dated March 9, 1880.

Application filed January 19, 1880.

*To all whom it may concern:*

Be it known that I, ABNER C. FISH, of Racine, in the county of Racine, and in the State of Wisconsin, have invented certain new and useful Improvements in Lever-Locks for Wagon-Brakes; and I do hereby declare that the following is a full, clear, and exact description thereof.

My invention relates to improvements in locks for wagon-brakes; and it consists in the device hereinafter described.

In the drawings, Figure 1 is a side view of my brake-lock with part of the lever broken away, and showing the pawl in engagement with the ratchet. Fig. 2 is a like view, showing the pawl raised from engagement with the ratchet.

The operating-lever is composed of two sections, the lower one of which, A', is bifurcated to permit the ratchet D to pass through it, and is provided with a socket, $d$, for a spring, $b$. A lug, B, also projects out from the section A', and is covered by a plate, $e$, which, as well as the socket $d$, may be cast with it.

The lower end of section A is rounded, as at $a$, and shouldered, as at $a'$, and this section is pivoted in section A'.

The pawl C is pivoted between the lugs B, and has an extension, $c$, which projects back and rests upon spring $b$, which tends to force its opposite end between the ratchet-teeth. In this position of the pawl the extension $c$, bearing against the rounded end $a$ of the section A, will tend to keep it in an upright position and prevent its rattling. The plate $e$ will also serve as a solid stop to give the bar or lever rigidity as the brake is applied. Now, when the brake is to be eased up the section A is thrust backward from the top until the rounded end $a$ carries the extension $c$ down upon the socket $d$. This will raise the pawl sufficiently to clear the ratchet and at the same time give a solid support for the end of the section A, as before mentioned, while the shoulder $a'$ will permit the other edge of the end $a$ to hug closely the plate $e$ and receive a support from it when the brake is being applied, which will render it substantially rigid.

Either a spiral or rubber spring may be used in the socket $d$, the outer edge of which should be higher than the inner, to give an even bearing to the extension of the pawl.

My invention possesses all the elements of strength to be found in a single lever, with the least complication and the greatest simplicity of a sectional self-acting lever, and is not subject to the noisy vibration so common in devices of this class.

I am aware that I am not the first to use a sectional brake-lever.

I am also aware that sectional brake-levers have been constructed to automatically release their pawls, and therefore I do not claim such, broadly; but What I do claim is—

The lower section provided with plate or stop $e$ and socket $d$, the pawl having rear extension, which projects over the socket $d$, and the section A, rounded at its lower end, the socket acting both as a receptacle for the spring which actuates the pawl and as a stop for the section A after it has been sufficiently inclined to carry the pawl free from the ratchet, as set forth.

In testimony that I claim the foregoing I have hereunto set my hand this 8th day of January, 1880.

ABNER C. FISH.

Witnesses:
WILLIAM A. WALKER,
J. B. WALKER.